(12) United States Patent
Apelbaum

(10) Patent No.: US 7,627,662 B2
(45) Date of Patent: Dec. 1, 2009

(54) TRANSACTION REQUEST PROCESSING SYSTEM AND METHOD

(75) Inventor: Jacob Apelbaum, Sayville, NY (US)

(73) Assignee: First Data Corporation, Englewood, CO (US)

( * ) Notice: Subject to any disclaimer, the term of this patent is extended or adjusted under 35 U.S.C. 154(b) by 536 days.

(21) Appl. No.: 11/388,358

(22) Filed: Mar. 23, 2006

(65) Prior Publication Data
US 2007/0226342 A1 Sep. 27, 2007

(51) Int. Cl.
*G06F 15/173* (2006.01)
*G06F 15/16* (2006.01)
(52) U.S. Cl. .................. 709/223; 709/203; 709/224
(58) Field of Classification Search ......... 709/223–224, 709/201–203
See application file for complete search history.

(56) References Cited

U.S. PATENT DOCUMENTS

| | | | |
|---|---|---|---|
| 5,944,779 A * | 8/1999 | Blum | 709/201 |
| 6,112,225 A | 8/2000 | Kraft | |
| 6,112,243 A * | 8/2000 | Downs et al. | 709/226 |
| 6,418,462 B1 | 7/2002 | Xu | |
| 6,505,257 B2 * | 1/2003 | Murata et al. | 710/8 |
| 6,711,616 B1 | 3/2004 | Stamm | |
| 6,963,917 B1 * | 11/2005 | Callis et al. | 709/227 |
| 2002/0111814 A1 * | 8/2002 | Barnett et al. | 705/1 |
| 2004/0103413 A1 * | 5/2004 | Mandava et al. | 718/100 |
| 2004/0205108 A1 * | 10/2004 | Tanaka | 709/201 |

* cited by examiner

*Primary Examiner*—Salad Abdullahi
*Assistant Examiner*—Hussein A El Chanti
(74) *Attorney, Agent, or Firm*—Townsend and Townsend and Crew, LLP

(57) ABSTRACT

Methods, systems, and machine-readable media are disclosed for distribution of processing of large amounts of data. According to one embodiment, a method of distributing processing of a dataset maintained by a mainframe from the mainframe to one or more of a plurality of servers can comprise initiating a job on the mainframe. The job can be associated with a process to be performed on the dataset. The dataset can be transferred from the mainframe to a repository separate from the mainframe and the plurality of servers based on the job. The dataset can be assigned to one or more servers of the plurality of servers. The method can further include processing the data set on the one or more servers and returning the processed dataset to the mainframe from the repository.

13 Claims, 7 Drawing Sheets

TRANSACTION REQUEST PROCESSING SYSTEM AND METHOD

BACKGROUND OF THE INVENTION

Embodiments of the present invention relate generally to processing data in a network environment and more particularly to distributing processing of a dataset maintained by a mainframe from the mainframe to one or more of a plurality of servers.

Various types of companies and other organizations or entities commonly maintain one or more mainframe computers for data processing purposes. These mainframe computers are typically used to process a large corpus of information that may be maintained in a database or other repository within or accessible by the mainframe. However, depending upon the size of the corpus of information, the type of information contained therein, the operations to be performed thereon, etc. processing one or more sets of data from the corpus of information by the mainframe can be expensive in terms of the resources required or utilized by the mainframe.

Additionally, the organization maintaining the mainframe and the corpus of information may maintain any number of servers that may be dedicated or otherwise tasked with performing other functions. For example, the organization may maintain one or more web servers, file servers, database management systems, etc. However, these servers may, at times, be less than fully utilized. That is, depending upon the time of day, the tasks assigned to the individual server(s), the operations of the organization, etc., one or more of these dedicated servers may be idle and/or have excess resources available for handling processing that would normally be performed by the mainframe.

Hence, there is a need for methods and systems that allow for distributing processing of a dataset maintained by a mainframe from the mainframe to one or more of a plurality of servers.

BRIEF SUMMARY OF THE INVENTION

Methods, systems, and machine-readable media are disclosed for distribution of processing of large amounts of data. According to one embodiment, a method of distributing processing of a dataset maintained by a mainframe from the mainframe to one or more of a plurality of servers can comprise initiating a job on the mainframe. The job can be associated with a process to be performed on the dataset. Initiating a job on the mainframe can comprise sending one or more executable commands to the mainframe in a format native to the mainframe.

According to one embodiment, the dataset can be transferred from the mainframe to a repository separate from the mainframe and the plurality of servers based on the job. In some cases, transferring the dataset from the mainframe to the repository can comprise transferring the dataset from the mainframe to a mainframe staging area and from the mainframe staging area to the repository. The dataset can be assigned to one or more servers of the plurality of servers. For example, assigning the dataset to one or more servers can comprise determining availability of each server of the plurality of servers and dividing the dataset between one or more servers of the plurality of servers based on an indication of availability from the one or more servers. The method can further include processing the data set on the one or more servers and returning the processed dataset to the mainframe from the repository. Returning the processed dataset to the mainframe can comprise transferring the dataset from the repository to a mainframe staging area and from the mainframe staging area to the mainframe.

According to one embodiment, the method can further comprise generating one or more staging tables. Each staging table can comprise a subset of the dataset. The number of staging tables can, for example, equal a number of servers indicating availability. Processing the dataset on one or more servers can comprise assigning a staging table to each of the one or more servers indicating availability and initiating on each of the one or more servers indicating availability a task to process the staging table assigned to that server. Furthermore, returning the processed dataset to the mainframe can comprise combining the staging tables into a master dataset and returning the processed dataset to the mainframe can comprise providing the master dataset to the mainframe.

According to another embodiment, a method of interacting with a mainframe computer to distribute processing of a dataset maintained by the mainframe to one or more of a plurality of servers can comprise receiving a job initiation signal from a manager separate from the mainframe and the plurality of servers. The job initiation signal can be associated with a process to be performed on the dataset. The method can also include initiating a job on the mainframe to cause the mainframe to transfer the dataset to a repository separate from the mainframe and the plurality of servers. Initiating a job on the mainframe can comprise, for example, sending one of more executable commands to the mainframe in a format native to the mainframe. In some cases, initiating the job on the mainframe can comprise receiving the dataset from the mainframe via a mainframe staging area. In such a case, the method can further comprise moving the dataset from the mainframe staging area to the repository. Notification of completion of processing of the dataset can be received from the manager. The processed dataset can be provided back to the mainframe from the repository. Providing the dataset back to the mainframe from the repository can comprise moving the processed dataset from the repository to the mainframe via the mainframe staging area.

According to yet another embodiment, a method of distributing processing of a dataset from a mainframe to one or more of a plurality of servers can comprise sending a job initiation signal to a host integration server separate from the mainframe and the plurality of servers. The job initiation signal can, for example, causes the host integration server to execute native code on the mainframe to transfer the dataset to a repository separate from the mainframe and the plurality of servers. The dataset can be assigned to one or more of the plurality of servers. According to one embodiment, prior to assigning the dataset to one or more servers, availability of each of the plurality of servers can be checked. In such a case, assigning the dataset to one or more servers of the plurality of servers can comprise dividing the dataset between the one or more servers based on an indication of availability from the one or more servers. Tasks can be initiated on each of the one or more servers. Each task can, for example, correspond to a portion of the dataset and cause the server to process the dataset. In response to all of the tasks being completed, a notice can be sent to the host integration server.

According to one embodiment, the method can further comprise generating one or more staging tables. Each staging table can comprise a subset of the dataset. In some cases, the number of staging tables can equal the number of servers indicating availability. The method can further comprise, in response to each of the tasks being completed and prior to sending a notice to the host integration server, assembling the staging tables into a master dataset. The master dataset can be sent to the mainframe. Sending the master dataset to the mainframe can comprise copying the master dataset to a mainframe staging area.

According to one embodiment, after initiating tasks on the one or more servers, a status of each of the plurality of servers can be checked. In response to a change of status of one or more of the servers of the plurality of servers, processing of the dataset can be redistributed. Redistributing processing of the dataset can comprise reassigning a portion of the dataset from an unavailable server to an available server. Reassigning can comprise creating a new staging table representing an unfinished portion of a previous staging table assigned to an unavailable server and assigning the new staging table to an available server.

According to still another embodiment, a system can comprise a mainframe adapted to maintain a dataset, a plurality of dedicated servers, a repository, and a host integration server communicatively coupled with the mainframe and the repository. The host integration server can be adapted to initiate on the mainframe a job associated with a process to be performed on the dataset and to transfer the dataset from the mainframe to the repository. The host integration server can initiate a job on the mainframe by sending one or more executable commands to the mainframe in a format native to the mainframe. According to one embodiment, the host integration server can maintain a mainframe staging area. In such a case, the host integration server can be adapted to transfer the dataset from the mainframe to the repository by transferring the dataset from the mainframe to the mainframe staging area and from the mainframe staging area to the repository.

The system can also include a cluster manager communicatively coupled with the host integration server, the repository, and each of the plurality of dedicated servers. The cluster manager can be adapted to assign the dataset to one or more servers of the plurality of dedicated servers for processing by the one or more servers. The cluster manager can be adapted to assign the dataset to one or more severs, for example, by determining availability of each server of the plurality of dedicated servers and dividing the dataset between one or more servers of the plurality of dedicated servers based on an indication of availability from the one or more servers. According to one embodiment, the cluster manager can be further adapted to generate one or more staging tables in the repository. Each staging table can comprise a subset of the dataset and the number of staging tables can, for example, equal the number of servers indicating availability.

The cluster manager can be further adapted to assign a staging table to each of the one or more servers indicating availability and initiate on each of the one or more servers indicating availability a task to process the staging table assigned to that server. After initiating tasks on the one or more servers, the cluster manager may check a status of each of the plurality of dedicated servers. According to one embodiment, in response to a change of status of one or more of the servers of the plurality of dedicated servers, the cluster manager can redistribute processing of the dataset. The cluster manager can redistribute processing of the dataset by reassigning a portion of the dataset from an unavailable server to an available server. More specifically, the cluster manager can reassign a portion of the dataset from an unavailable server to an available server, for example, by creating a new staging table representing an unfinished portion of a previous staging table assigned to an unavailable server and assigning the new staging table to an available server.

According to one embodiment, the host integration server can be further adapted to return the processed dataset to the mainframe from the repository. The host integration server can return the processed dataset to the mainframe by transferring the dataset from the repository to the mainframe staging area and from the mainframe staging area to the mainframe. In some cases, the host integration server can return the processed dataset to the mainframe by combining the staging tables into a master dataset and providing the master dataset to the mainframe.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for distribution of processing of large amounts of data. It should be noted that, while discussed herein with reference to distributing processing of database operations, embodiments of the present invention are thought to be useful with other types of operations that involve handling large amounts of data or performing a large number of operations. For example, embodiments of the present invention are thought to be equally applicable to floating-point arithmetic operations. Other applications are also contemplated and considered to be within the scope of the present invention.

Generally speaking, distributing processing of a dataset maintained by a mainframe from the mainframe to one or more of a plurality of servers can comprise initiating a job on the mainframe. The job can be associated with a process to be performed on the dataset. The dataset can be transferred from the mainframe to a repository separate from the mainframe and the plurality of servers based on the job. The dataset can be assigned to one or more servers of the plurality of servers. The method can further include processing the data set on the one or more servers and returning the processed dataset to the mainframe from the repository.

Figure 1:
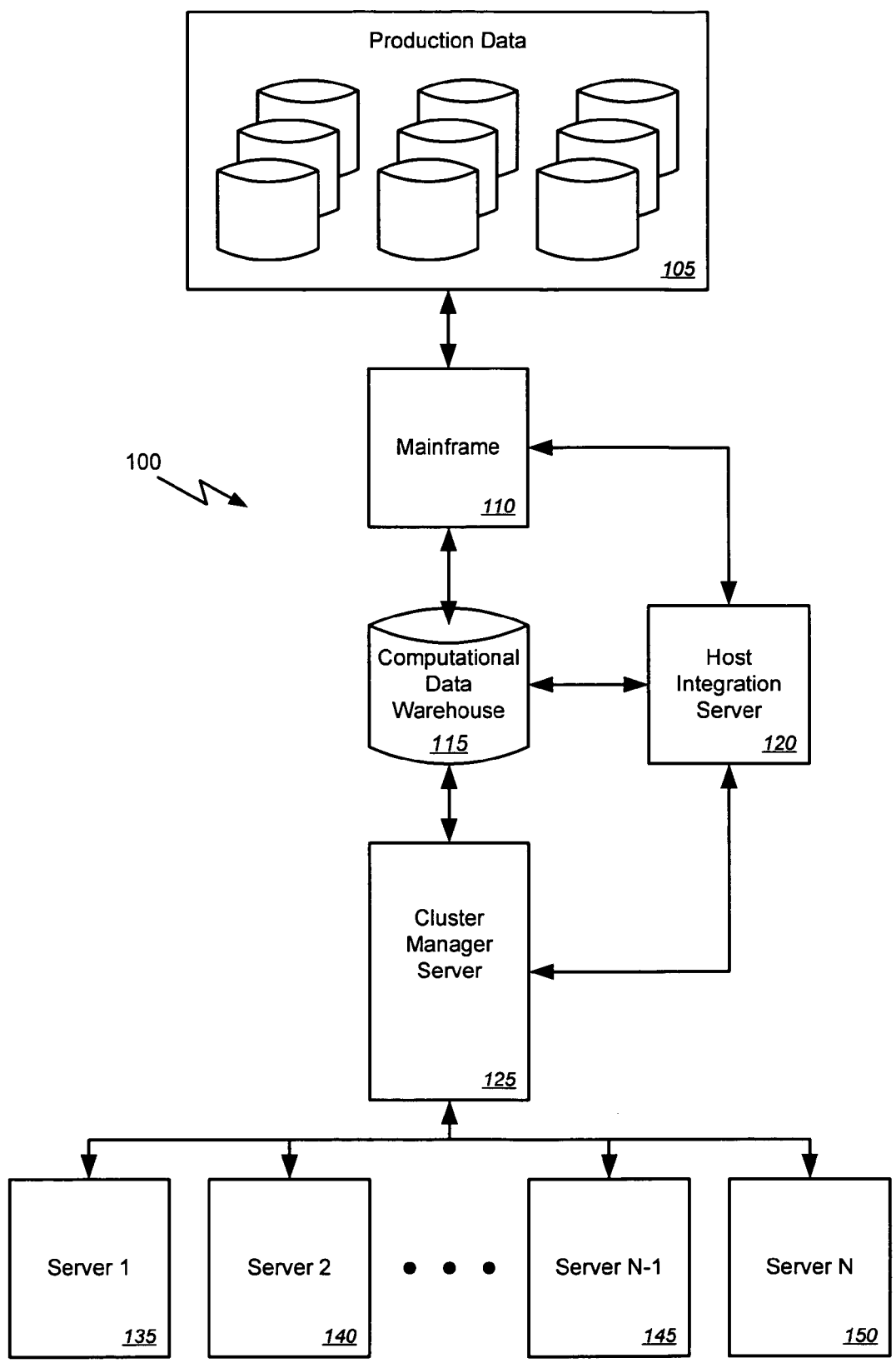
FIG. 1 is a block diagram illustrating functional components of a system in which processing of a dataset can be distributed to a plurality of available servers according to one embodiment of the present invention.

FIG. 1 is a block diagram illustrating functional components of a system in which processing of a dataset can be distributed to a plurality of available servers according to one embodiment of the present invention. In this example, the system 100 includes a mainframe 110 such as may be commonly used to maintain, manage, provide access to, etc. a large corpus of information such as production data 10S which may represent any number of different types of information depending upon the manner, environment, etc. in which the mainframe 110 is used. For example, the mainframe may be used to maintain in the production data 105 information related to a variety of financial accounts of any number of individuals or entities.

The system can also include a number of servers 135-150. These servers 135-150 may be dedicated or assigned to performing tasks such as serving files, serving web pages, handling database requests, etc. However, as is typical in most cases, the resources of these servers 135-150 may not be fully utilized at all times. That is, at any given time, some of the servers 135-150 may be idle or not fully utilized. According to one embodiment of the present invention, processing of a set of data from the production data 105 normally performed by the mainframe 110 may be distributed to one or more of the servers 135-150 that may be available or idle. For example, large database operations such as sorting, searching, collating, etc. that use large amounts of the mainframe's 110 computing resources may be distributed to one or more of the servers 135-150 that are idle or underutilized at the time thereby relieving some of the load of the mainframe 110 and more efficiently utilizing the resources of the servers 135-150.

However, not all of the servers 135-150 are idle or have excess resource available at the same time. For example, one server 135 that may be used as a file server may be busy during normal business hours but may be largely idle at night and on weekends. Another server used to handle database requests or processing may have peak and idle times at the same or different times. According to one embodiment of the present invention, to help determine current availability of the servers 135-150 and to distribute processing of a dataset of the production data 105 from the mainframe 110 to the servers 135-150, the system 100 can also include a host integration server 120 communicatively coupled with the mainframe 110 and a cluster manager 125 communicatively coupled with the host integration server 120 and each of the plurality of dedicated servers 135-150. The system 100 can further include a repository such as computational data warehouse 115 separate from the mainframe and the production data 105. Both the host integration server 120 and the cluster manager 125 can be communicatively coupled with the computational data warehouse 115.

As will be discussed in greater detail below, the host integration server 120 can be adapted to initiate on the mainframe 110 a job associated with a process to be performed on dataset from the production data 105. According to one embodiment, the host integration server 120 can initiate a job on the mainframe by sending one or more executable commands to the mainframe 110 in a format native to the mainframe 110. For example, the host integration server may send an executable program or script to the mainframe 110 to be executed thereon causing the mainframe 110 to initiate the process. Furthermore, the host integration server 120 can transfer the dataset from the mainframe 110 to the computational data warehouse 115.

The cluster manager 125 can be adapted to assign the dataset to one or more servers of the plurality of dedicated servers 135-150 for processing. As will be discussed in greater detail below, the cluster manager 125 can be adapted to assign the dataset to one or more severs by determining availability of each server of the plurality of dedicated servers 135-150 and dividing the dataset between one or more servers based on an indication of availability from the one or more servers. That is, the cluster manager can check each of the servers 135-150 to determine which of the servers 135-150 are idle or are otherwise available to accept additional processing. Based on an indication of availability from one or more of the servers, 135-150, the cluster manager can then divide and/or distribute the dataset from the computational data warehouse 115 between the available servers and initiate on those servers a task to process the dataset accordingly.

According to one embodiment of the present invention, the cluster manager 125 can also dynamically redistribute the processing of the dataset between the servers 135-150 as availability of the servers 135-150 changes during processing of the dataset. That is, the cluster manager 125 can be further adapted to, after initiating tasks on the one or more servers, check a status of each of the plurality of dedicated servers 135-150. In response to a change of status of one or more of the servers of the plurality of dedicated servers 135-150, the cluster manager 125 can redistribute processing of the dataset. So, for example, the cluster manager 125 can redistributes processing of the dataset by reassigning a portion of the dataset from a server that has become unavailable to a server that has become available since initiation of the process. In another case, the cluster manager can redistribute processing between all servers indicating availability, between servers that are at various stages of completion of the assigned portion of the dataset, etc. Additional details of how dynamic reassignment or redistribution of processing between the servers 135-150 can be managed will be discussed in greater detail below.

Upon completion of the processing of the dataset, the cluster manager 125 can provide to the computational data warehouse 115 a finished or processed dataset. The host integration server 120 can in turn, upon notification from the cluster manager 125, return the processed dataset to the mainframe 110 from the computational data warehouse 115. In this way, the mainframe 110 can be provided with a dataset that is fully processed as required.

So, for example, a set of data from the production data 105 may need to be periodically sorted. In such a case, the cluster manager 125 can request the host integration server 120 to initiate a job on the mainframe 110 to transfer or copy the dataset to the computational data warehouse 115. Once the dataset is available in the computational data warehouse 115, the cluster manager 125 can distribute processing of the dataset between servers 135-150 that are available at the time and initiate on each of these servers a task for processing, in this example sorting, the assigned portion of the dataset. If availability of the servers 135-150 changes during processing of the dataset, the cluster manager 125 can dynamically reassign the dataset to or between available servers. Once the servers 135-150 have finished sorting or otherwise processing the dataset, the host integration server 120 can provide the sorted dataset back to the mainframe 110.

Figure 2:
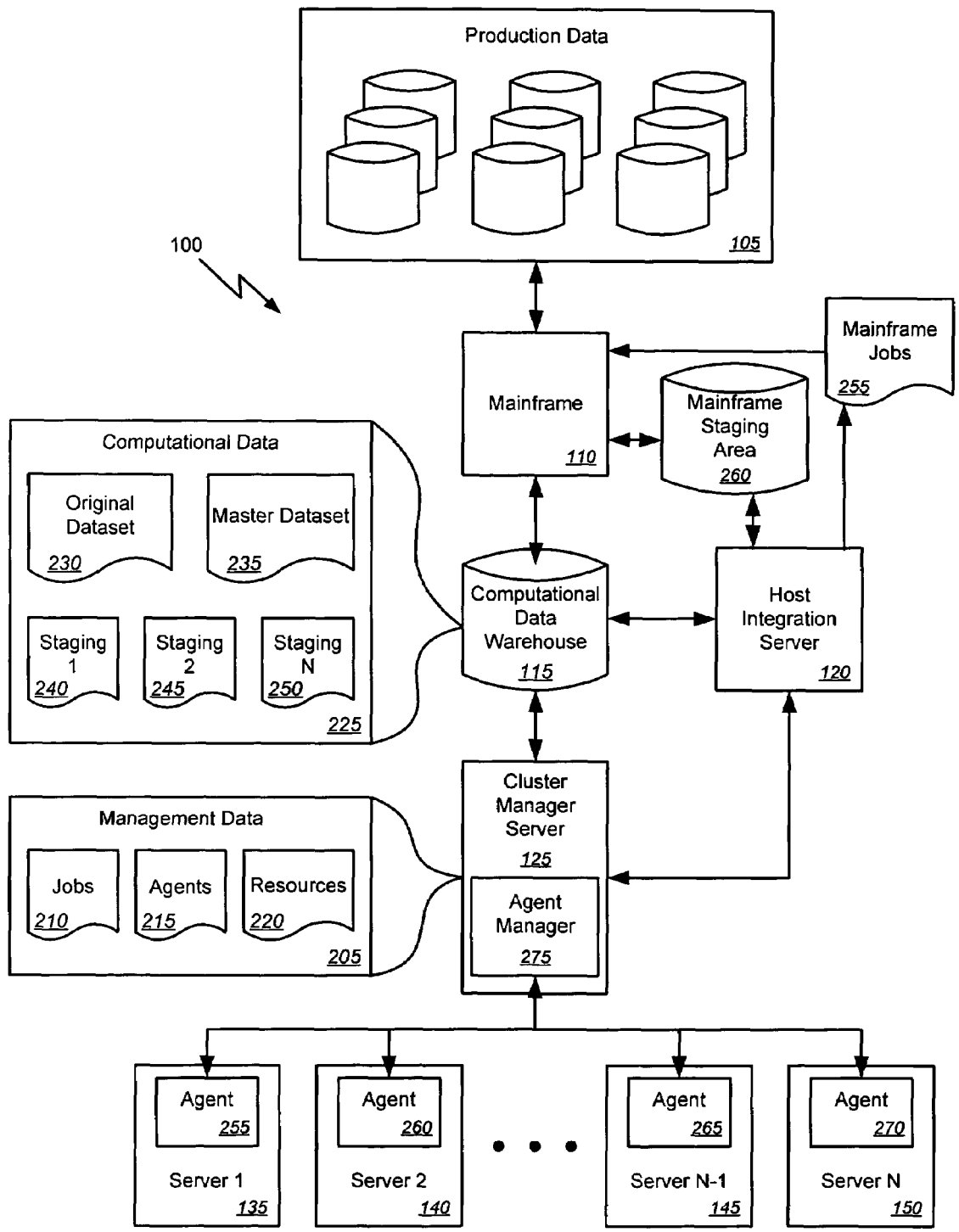
FIG. 2 is a block diagram illustrating the system of FIG. 1 including additional details according to one embodiment of the present invention.

FIG. 2 is a block diagram illustrating the system of FIG. 1 including additional details according to one embodiment of the present invention. As discussed above, the host integration server 120 can be adapted to initiate on the mainframe 110 a job associated with a process to be performed on the dataset and to transfer the dataset from the mainframe 110 to the computational data warehouse 115 or other repository separate from the mainframe 110. The host integration server may in some cases may initiate this job based on a timer or some other periodic or other event. According to one embodiment of the present invention, the cluster manager 125 may maintain a set of management data 205 that includes a definition of jobs 210 to be performed. Based on information in this definition of jobs 210 the cluster manager 125 can trigger or otherwise signal the host integration server 120 to initiate a job on the mainframe 110.

Also as discussed above, the host integration server 255 can initiate a job on the mainframe 110 by sending or executing on the mainframe 110 one or more jobs 255 that can comprise executable commands in a format native to the mainframe 110. For example, the mainframe jobs 255 submitted by the host integration may comprise pre-saved, dynamically generated, or other executable programs or scripts that can be directly executed by the mainframe 110. These mainframe jobs 255 when executed by the mainframe 110 can cause the mainframe 110 to transfer or copy a selected dataset, identified in the job 255, to the host integration server 120.

According to one embodiment, the host integration server 120 can maintain a mainframe staging area 260. The mainframe staging area 260 may be a database, buffer, or other storage area maintained within or separate from the host integration server 120 and used to temporarily hold data being transferred or copied into or out of the mainframe 110 by the host integration server 120. Therefore, the host integration server 120 can be adapted to transfer the dataset from the mainframe 110 to the computational data warehouse 115 by transferring the dataset from the mainframe 110 to the mainframe staging area 260 and from the mainframe staging area 260 to the computational data warehouse 115 to be stored as the original dataset 230.

As discussed above, the cluster manager 125 can be adapted to assign the dataset 230 to one or more servers of the plurality of dedicated servers 135-150 for processing by the one or more servers. The cluster manager 125 can be adapted to assign the dataset 230 to one or more severs, for example, by determining availability of each server of the plurality of dedicated servers 275 and dividing the dataset 230 between one or more servers of the plurality of dedicated servers 135-150 based on an indication of availability from the one or more servers. According to one embodiment of the present invention, the cluster manager 125 may have installed therein an agent manager 275 while each of the servers 135-150 can have installed thereon an agent 255-270. The agent 255-270 of each server 135-150 can monitor the availability of the server on which it is installed and make this information available to the agent manager 275. Such information can be stored in a set of resource information 220 maintained in the management data 205 of the cluster manager. For example, each agent 255-270 may have a number of properties that it makes available to the agent manager 275. These properties may include one or more indications of the current availability of that server in terms of either available or not, some degree of availability, some combination thereof, etc. Based on availability information provided by each agent and stored in the resource information 220, the cluster manager 125 can select one or more of the servers 135-150 for processing the dataset 230.

According to one embodiment, the cluster manager 125 can be further adapted to generate one or more staging tables 240-250 in the computational data warehouse 115. Each staging table 240-250 can comprise a subset of the original dataset 230 and the number of staging tables 240-250 can, for example, equal the number of servers indicating availability. That is, if the cluster manager 125 determine, for example, that three servers are available for processing the dataset 230, the cluster manager 125 may create three staging tables 240-250 representing copies of three portions of the original dataset 230. These portions, i.e., the staging tables 240-250, may be of substantially equal size or may be divided based on relative availability of the servers. That is, if the agents 255-270 are able to provide and the resource information 220 indicates a relative level of availability, i.e., an indication of how much resources are available, the cluster manager 125 may create staging tables 240-250 that are copies of different sized portions of the original dataset 230 with the size of each staging table relative to the amount of available resource on a server which will handle the staging table.

The cluster manager 125 can be further adapted to assign a staging table 240-250 to each of the one or more servers indicating availability and initiate on each of the one or more servers indicating availability a task to process the staging table assigned to that server. That is, the cluster manager 125 can assign a staging table to a particular server and the agent manager 275 can instruct the agent on that server to cause the server to process the staging table as required, i.e., sort, search, etc. The tasks assigned to each agent as well as the agent's progress, as represented to the agent manager by the agent as a property of the agent, may be stored in agent information 215 of the management data 205 of the cluster manager 125.

After initiating tasks on the one or more servers, the cluster manager 125 may check a status of each of the plurality of dedicated servers 135-150. According to one embodiment, in response to a change of status of one or more of the servers of the plurality of dedicated servers 135-150, the cluster manager 125 can redistribute processing of the dataset. The change in status can be represented by a server becoming unavailable due to some dedicated task requiring processing or for some other reason. In some cases, a change in status may be detected based on the progress of the server handling an assigned staging table. For example, one server may have finished processing a staging table it was assigned while another has not. In such a case, the server that finished may be otherwise available for sharing the processing of the staging table of the server that is not yet finished. The cluster manager 125 can redistribute processing of the dataset by reassigning a portion of the dataset from an unavailable server to an available server. More specifically, the cluster manager 125 can reassign a portion of the dataset from an unavailable server to an available server, for example, by creating a new staging table representing an unfinished portion of a previous staging table assigned to an unavailable server and assigning the new staging table to an available server.

Once all staging tables have been processed to completion, the cluster manager 125 can inform the host integration server 120 of completion. The host integration server 120 can be further adapted to return the processed dataset to the mainframe 110 from the computational data warehouse 115. In some cases, the host integration server 120 can return the processed dataset to the mainframe 110 by combining the staging tables 240-250 into a master dataset 235 and providing the master dataset 235 to the mainframe 110. The host integration server 120 can return the processed dataset to the mainframe 110 by transferring the dataset from the computational data warehouse 115 to the mainframe staging area 260 and from the mainframe staging area 260 to the mainframe 110.

Figure 3:
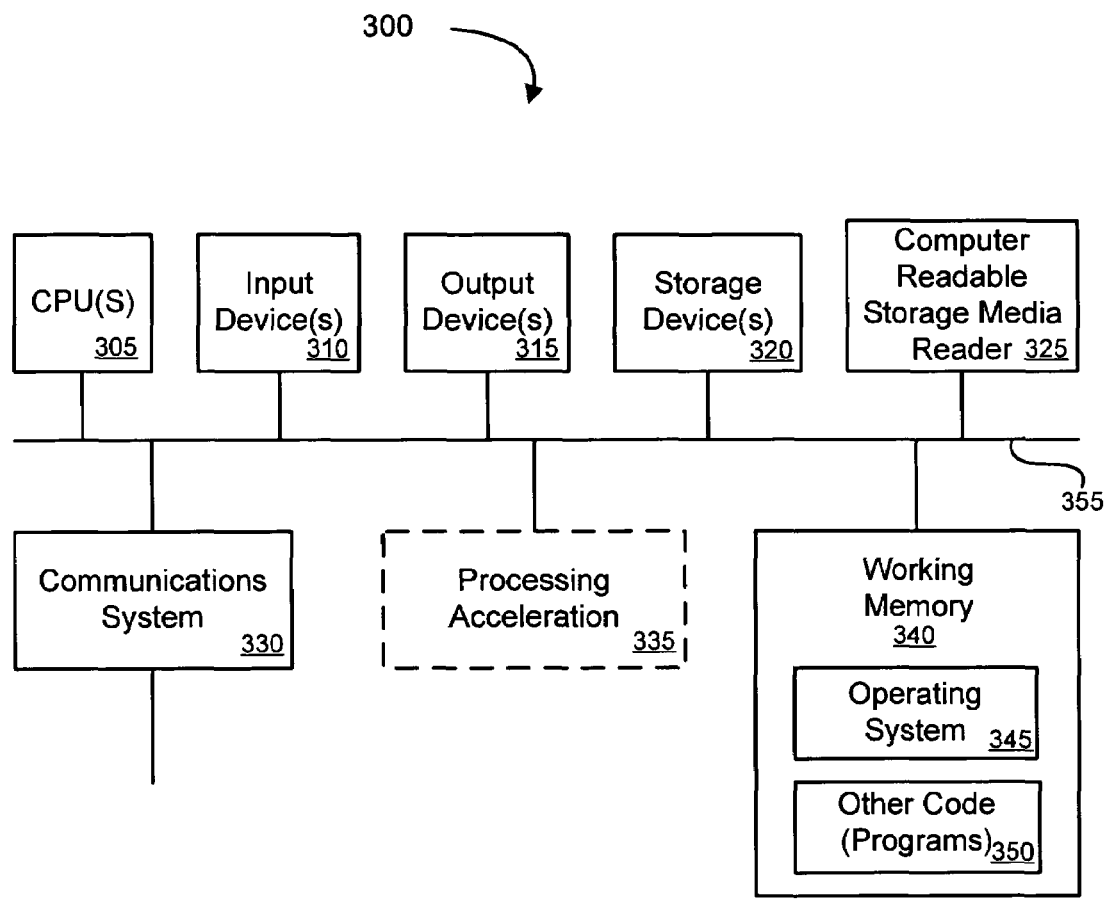
FIG. 3 is a block diagram illustrating an exemplary computer system upon which various elements of the system illustrated in FIGS. 1 and 2 may be implemented.

FIG. 3 is a block diagram illustrating an exemplary computer system upon which various elements of the exemplary environment illustrated in FIG. 1 may be implemented. The computer system 300 is shown comprising hardware elements that may be electrically coupled via a bus 355. The hardware elements may include one or more central processing units (CPUs) 305; one or more input devices 310 (e.g., a scan device, a mouse, a keyboard, etc.); and one or more output devices 315 (e.g., a display device, a printer, etc.). The computer system 300 may also include one or more storage device 220. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above communicatively coupled with and readable by CPU(s) 305. In some embodiments, the computer system 200 may also include a processing acceleration unit 335, which can include a DSP, a special-purpose processor and/or the like.

The computer-readable storage media reader 325 can further be connected to a computer-readable storage medium, together (and, optionally, in combination with storage device (s) 320) comprehensively representing remote, local, fixed, and/or removable storage devices plus storage media for temporarily and/or more permanently containing computer-readable information. The communications system 330 may permit data to be exchanged with a network and/or any other computer or other type of device.

The computer system 300 may also comprise software elements, shown as being currently located within a working memory 340, including an operating system 345 and/or other code 350, such as an application program. The application programs may implement the methods of the invention as described herein. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Figure 4:
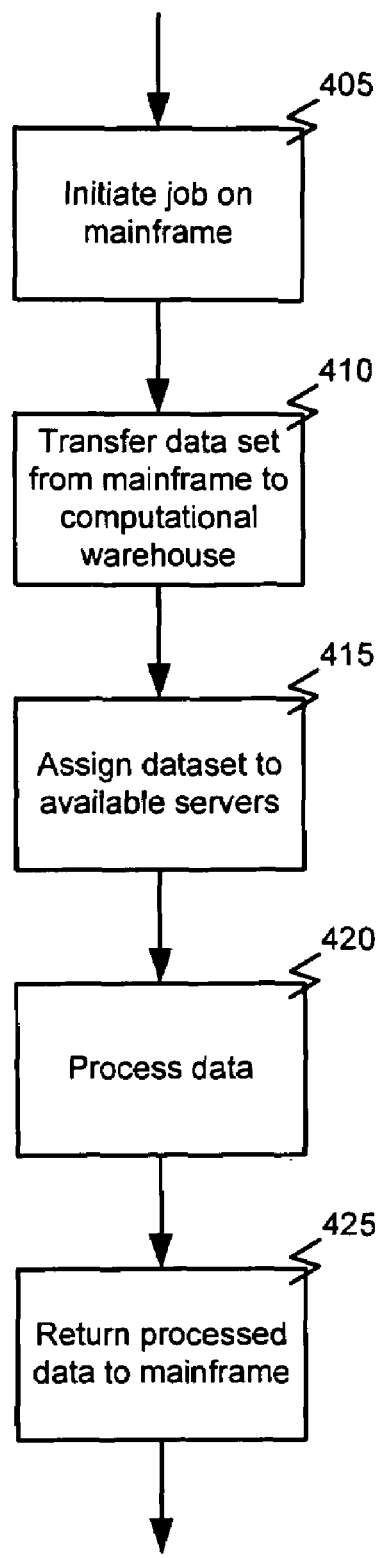
FIG. 4 is a flowchart illustrating, at a high level, distributing processing of a dataset to a plurality of available servers according to one embodiment of the present invention.

FIG. 4 is a flowchart illustrating, at a high level, distributing processing of a dataset to a plurality of available servers according to one embodiment of the present invention. In this example, processing begin with initiating 405 a job on the mainframe. As discussed above, the job can be associated with a process to be performed on the dataset. Furthermore, initiating 405 a job on the mainframe can comprise sending one or more executable commands to the mainframe in a format native to the mainframe.

The dataset can be transferred 410 from the mainframe to a repository separate from the mainframe and the plurality of servers based on the job. According to one embodiment, transferring 410 the dataset from the mainframe to the repository can comprise transferring the dataset from the mainframe to a mainframe staging area and from the mainframe staging area to the repository.

The dataset can be assigned 415 to one or more servers of the plurality of servers. Assigning 415 the dataset to one or more servers can comprise determining availability of each server of the plurality of servers and dividing the dataset between one or more servers of the plurality of servers based on an indication of availability from the one or more servers.

The dataset can be processed 420 on the one or more servers and the processed dataset can be returned 425 to the mainframe from the repository. Returning 425 the processed dataset to the mainframe can comprise transferring the dataset from the repository to a mainframe staging area and from the mainframe staging area to the mainframe.

Figure 5:
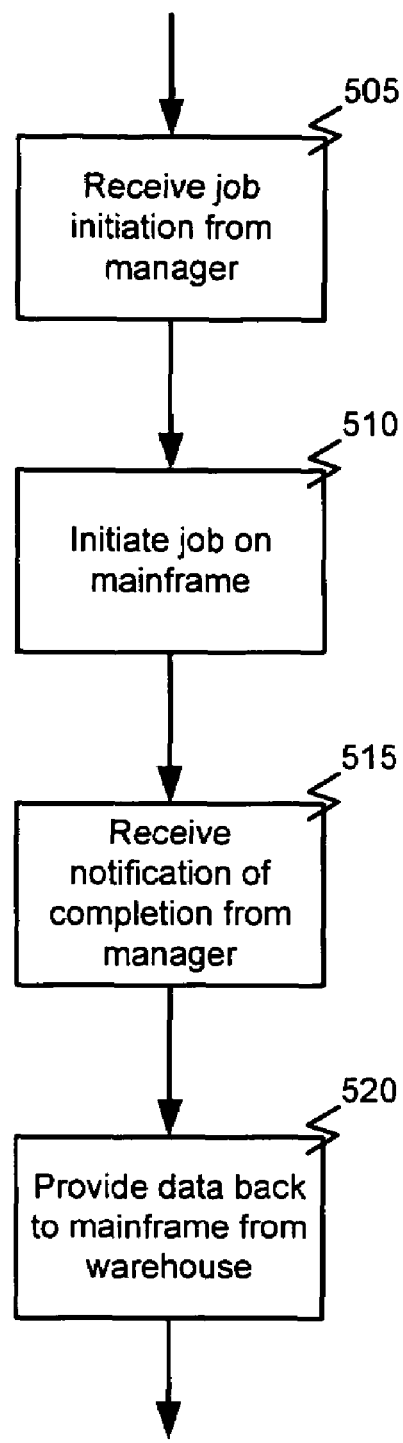
FIG. 5 is a flowchart illustrating a process for interacting with a mainframe computer to distribute processing of a dataset maintained by the mainframe according to one embodiment of the present invention.

FIG. 5 is a flowchart illustrating a process for interacting with a mainframe computer to distribute processing of a dataset maintained by the mainframe according to one embodiment of the present invention. More specifically, this example illustrates a process such as may be performed by a host integration server such as discussed above with reference to FIGS. 1 and 2. In this example, processing begins with receiving 505 a job initiation signal from a manager separate from the mainframe and the plurality of servers. The job initiation signal can be associated with a process to be performed on the dataset.

A job can be initiated 510 on the mainframe to cause the mainframe to transfer the dataset to a repository separate from the mainframe and the plurality of servers. Initiating 510 a job on the mainframe can comprise sending one of more executable commands to the mainframe in a format native to the mainframe. According to one embodiment, initiating 510 the job on the mainframe can further comprise receiving the dataset from the mainframe via a mainframe staging area and moving the dataset from the mainframe staging area to the repository.

Once the dataset has been processed by servers to which it is distributed, such as by the cluster manager discussed above, a notification of completion of processing of the dataset can be received 515 from the manager. The dataset can be provided 520, i.e., sent, copied, pushed, etc., back to the mainframe from the repository. Providing 520 the dataset back to the mainframe from the repository can comprise moving or copying the dataset from the repository to the mainframe via the mainframe staging area.

Figure 6:
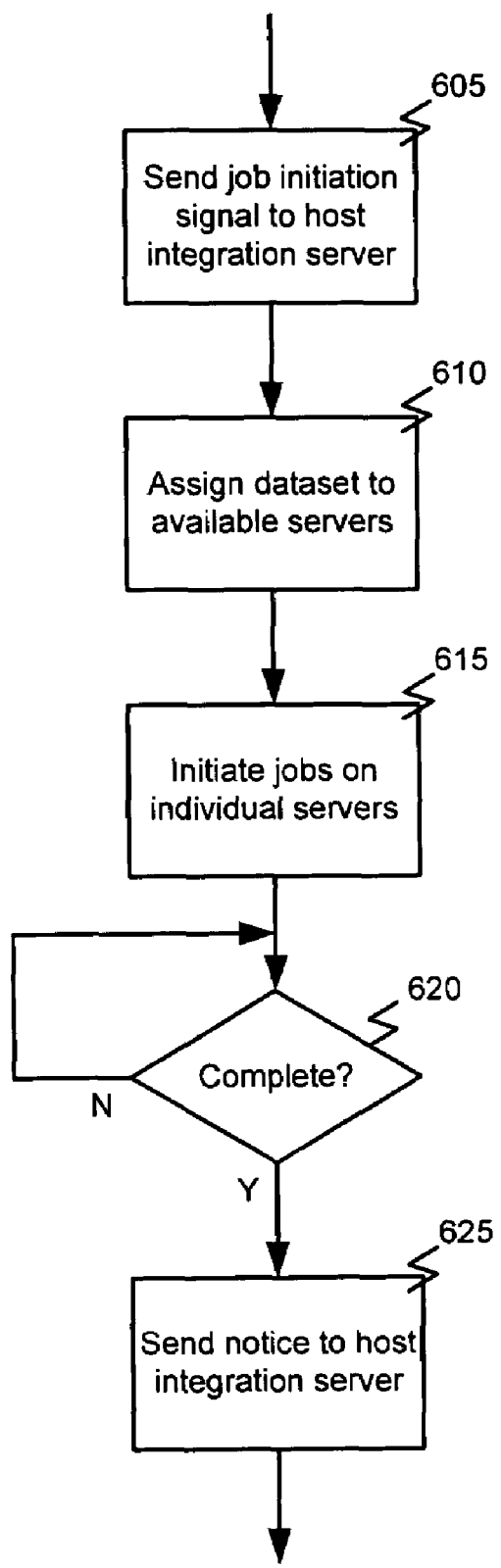
FIG. 6 is a flowchart illustrating a process for distributing and managing processing of a dataset on a plurality of servers according to one embodiment of the present invention.

FIG. 6 is a flowchart illustrating a process for distributing and managing processing of a dataset on a plurality of servers according to one embodiment of the present invention. More specifically, this example illustrates a process such as may be performed by a cluster manager such as discussed above with reference to FIGS. 1 and 2. In this example, processing begins with sending 605 a job initiation signal to a host integration server separate from the mainframe and the plurality of servers. As discussed above, the job initiation signal causes the host integration server to execute native code on the mainframe to transfer the dataset to a repository separate from the mainframe and the plurality of servers.

The dataset can be assigned 610 to one or more of the plurality of servers. That is, as discussed above, availability of each of the plurality of servers can be checked and the dataset can be divided between one or more servers based on an indication of availability from the one or more servers.

One or more tasks can be initiated 615 on each of the one or more servers. Each task can correspond, for example, to a portion of the dataset. The tasks can causes the server to process the dataset. Furthermore, after initiating 615 tasks on the one or more servers, a status of each of the plurality of servers can be checked 620 and a determination can be made as to whether processing of the dataset has been completed. In response to determining 620 that all of the tasks are completed, i.e., that processing of the dataset is complete, a notice can be sent 625 to the host integration server.

Figure 7:
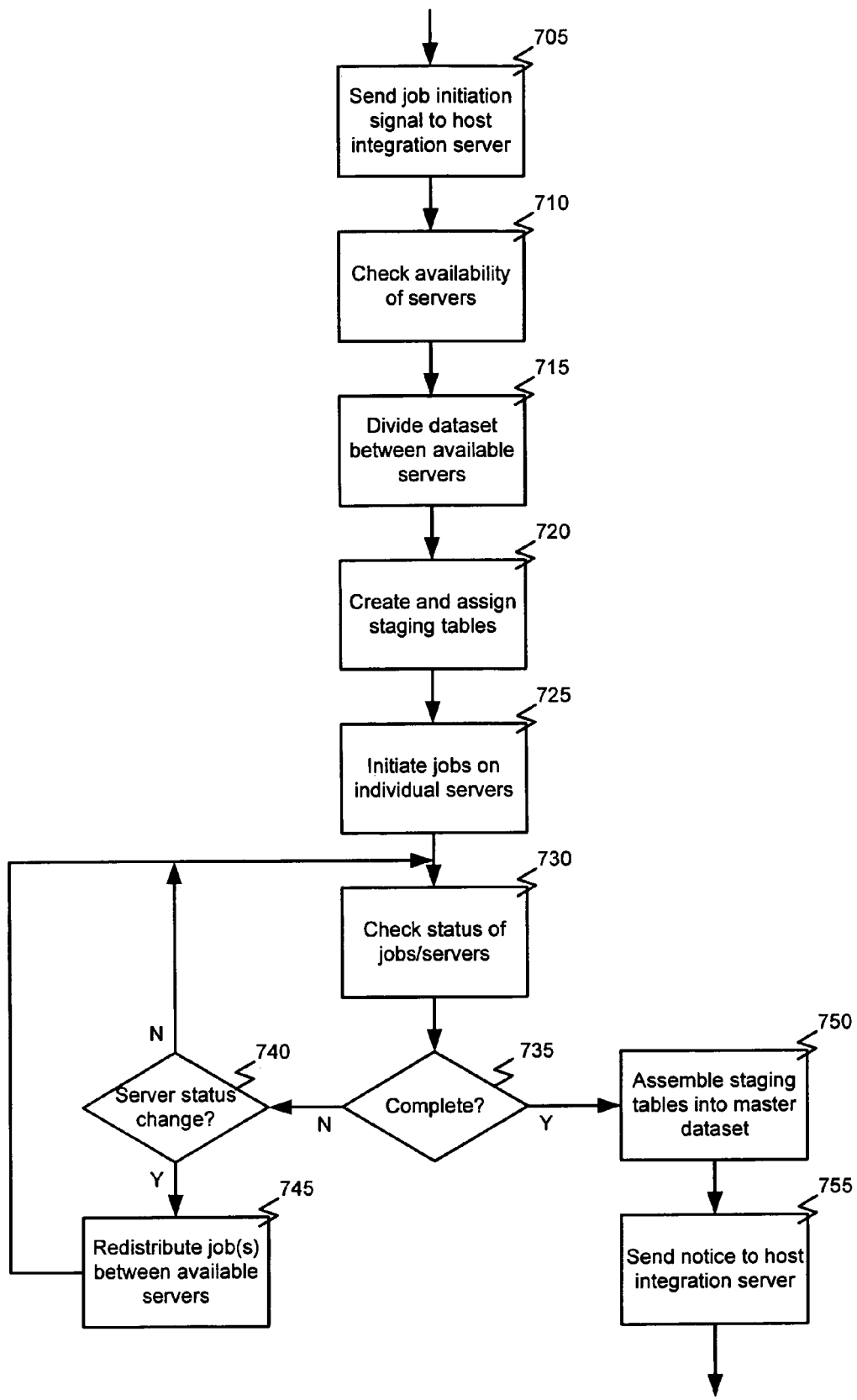
FIG. 7 is a flowchart illustrating additional details of a process for distributing and managing processing of a dataset on a plurality of servers according to one embodiment of the present invention.

FIG. 7 is a flowchart illustrating additional details of a process for distributing and managing processing of a dataset on a plurality of servers according to one embodiment of the present invention. In this example, processing begins with sending 705 a job initiation signal to a host integration server separate from the mainframe and the plurality of servers. The job initiation signal can, for example, causes the host integration server to execute native code on the mainframe to transfer the dataset to a repository separate from the mainframe and the plurality of servers.

Availability of each of the plurality of servers can be checked 710. As discussed above, checking the availability of a server can be based on availability information provided by an agent on each server through one or more properties made available to the agent manager of the cluster manager and/or stored in resource information by the cluster manager. Also as noted above, availability may be indicated as either available or not, some degree of availability, some combination thereof, etc.

The dataset can be assigned 715 to one or more of the plurality of servers. Assigning 715 the dataset to one or more servers of the plurality of servers can comprise dividing the dataset between the one or more servers based on an indication of availability from the one or more servers. According to one embodiment, the method can further comprise generating one or more staging tables. Each staging table can comprise a subset of the dataset. In some cases, the number of staging tables can equal the number of servers indicating availability.

Tasks can be initiated 725 on each of the one or more servers. Each task can, for example, correspond to a portion of the dataset and causes the server to process the dataset In response to all of the tasks being completed, a notice can be sent to the host integration server.

A determination 735 can be made, for example by checking a current status of the agent of each server, as to whether the task assigned to that server has been completed, i.e., whether the server has finished processing its staging table. In response to each of the tasks being completed the staging tables can be assembled 750 into a master dataset. A notice of completion can be sent 755 to the host integration server which, as discussed above, will sending the master dataset to the mainframe.

If a determination 735 is made that all tasks have not yet been completed, a status of each of the plurality of servers can be checked 740. In response to a change of status of one or more of the servers of the plurality of servers, processing of the dataset can be redistributed 745. Redistributing 745 processing of the dataset can comprise reassigning a portion of the dataset from an unavailable server to an available server. Reassigning can comprise creating a new staging table representing an unfinished portion of a previous staging table assigned to an unavailable server and assigning the new staging table to an available server.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of distributing processing of a dataset from a mainframe to one or more of a plurality of servers, the method comprising:

sending a job initiation signal to a host integration server separate from the mainframe and the plurality of servers, wherein the job initiation signal causes the host integration server to execute native code on the mainframe to transfer the dataset to a repository separate from the mainframe and the plurality of servers;

checking availability of each of the plurality of servers;

assigning the dataset to one or more of the plurality of servers, wherein assigning the dataset to one or more servers of the plurality of servers further comprises dividing the dataset between the one or more servers based on an indication of availability from the one or more servers;

generating one or more staging tables wherein each staging table comprises a subset of the dataset and wherein the number of staging tables equals a number of servers indicating availability;

initiating tasks on each of the one or more servers, wherein each task corresponds to a portion of the dataset and causes the server to process the dataset;

checking a status of each of the plurality of servers;

in response to a change of status of one or more of the servers of the plurality of servers, redistributing processing of the dataset, wherein redistributing processing of the dataset comprises reassigning a portion of the dataset from an unavailable server to an available server and wherein reassigning comprises creating a new staging table representing an unfinished portion of a previous staging table assigned to an unavailable server and assigning the new staging table to an available server; and in response to all of the tasks being completed, sending a notice to the host integration server.

2. The method of claim 1, further comprising, in response to each of the tasks being completed and prior to sending a notice to the host integration server, assembling the staging tables into a master dataset.

3. The method of claim 2, further comprising sending the master dataset to the mainframe.

4. The method of claim 3, wherein sending the master dataset to the mainframe comprises copying the master dataset to a mainframe staging area.

5. A system comprising:

a mainframe adapted to maintain a dataset;

a plurality of dedicated servers;

a repository;

a host integration server communicatively coupled with the mainframe and the repository, wherein the host integration server is adapted to initiate on the mainframe a job associated with a process to be performed on the dataset and to transfer the dataset from the mainframe to the repository and wherein the host integration server maintains a mainframe staging area and is adapted to transfer the dataset from the mainframe to the repository by transferring the dataset from the mainframe to the mainframe staging area and from the mainframe staging area to the repository;

a cluster manager communicatively coupled with the host integration server, the repository, and each of the plurality of dedicated servers, wherein the cluster manager is adapted to assign the dataset to one or more servers of the plurality of dedicated servers for processing by the one or more servers by dividing the dataset between one or more servers of the plurality of dedicated servers based on an indication of availability from the one or more servers, determine availability of each server of the plurality of dedicated servers, generate one or more staging tables in the repository, wherein each staging table comprises a subset of the dataset and wherein the number of staging tables equals a number of servers indicating availability, assign a staging table to each of the one or more servers indicating availability, initiate on each of the one or more servers indicating availability a task to process the staging table assigned to that server, check a status of each of the plurality of dedicated servers, in response to a change of status of one or more of the servers of the plurality of dedicated servers, redistribute processing of the dataset by reassigning a portion of the dataset from an unavailable server to an available server by creating a new staging table representing an unfinished portion of a previous staging table assigned to an unavailable server, and assigning the new staging table to an available server.

6. The system of claim 5, wherein the host integration server initiates a job on the mainframe by sending one or more executable commands to the mainframe in a format native to the mainframe.

7. The system of claim 5, wherein the host integration server is farther adapted to return the processed dataset to the mainframe from the repository.

8. The system of claim 7, wherein the host integration server returns the processed dataset to the mainframe by transferring the dataset from the repository to the mainframe staging area and from the mainframe staging area to the mainframe.

9. The system of claim 8, wherein the host integration server returns the processed dataset to the mainframe by combining the staging tables into a master dataset and providing the master dataset to the mainframe.

10. A machine-readable medium having stored thereon a series of instructions which, when executed by a processor, cause the processor to distribute processing of a dataset from a mainframe to one or more of a plurality of servers by:

sending a job initiation signal to a host integration sewer separate from the mainframe and the plurality of servers, wherein the job initiation signal causes the host integration sewer to execute native code on the mainframe to transfer the dataset to a repository separate from the mainframe and the plurality of servers;

checking availability of each of the plurality of servers;

assigning the dataset to one or more of the plurality of servers, wherein assigning the dataset to one or more servers of the plurality of servers further comprises dividing the dataset between the one or more servers based on an indication of availability from the one or more servers;

generating one or more staging tables wherein each staging table comprises a subset of the dataset and wherein the number of staging tables equals a number of servers indicating availability;

initiating tasks on each of the one or more servers, wherein each task corresponds to a portion of the dataset and causes the server to process the dataset;

checking a status of each of the plurality of servers;

in response to a change of status of one or more of the servers of the plurality of servers, redistributing processing of the dataset, wherein redistributing processing of the dataset comprises reassigning a portion of the dataset from an unavailable server to an available server and wherein reassigning comprises creating a new staging table representing an unfinished portion of a previous staging table assigned to an unavailable server and assigning the new staging table to an available server; and in response to all of the tasks being completed, sending a notice to the host integration server.

11. The machine-readable medium of claim 10, further comprising, in response to each of the tasks being completed and prior to sending a notice to the host integration server, assembling the staging tables into a master dataset.

12. The machine-readable medium of claim 11, further comprising sending the master dataset to the mainframe.

13. The machine-readable medium of claim 12, wherein sending the master dataset to the mainframe comprises copying the master dataset to a mainframe staging area.

* * * * *

UNITED STATES PATENT AND TRADEMARK OFFICE
CERTIFICATE OF CORRECTION

PATENT NO. : 7,627,662 B2
APPLICATION NO. : 11/388358
DATED : December 1, 2009
INVENTOR(S) : Jacob Apelbaum Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Second Day of November, 2010

David J. Kappos
*Director of the United States Patent and Trademark Office*